Jan. 15, 1924.
L. L. WELLS
WHIFFLE HOOK
Filed Oct. 23, 1922
1,481,165
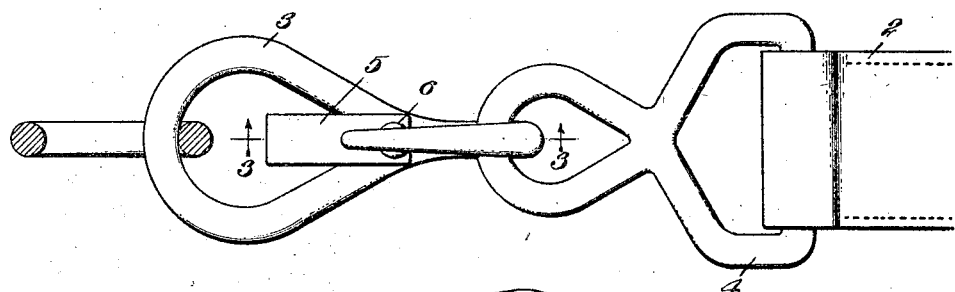
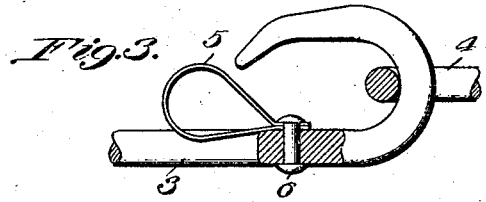
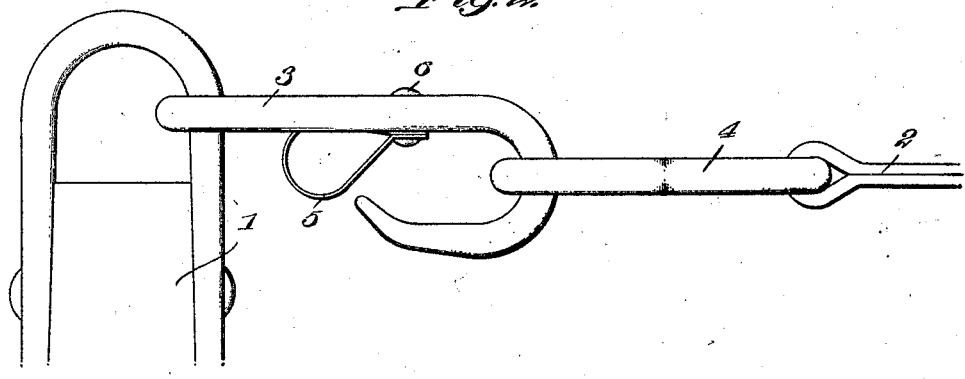
Leslie L. Wells
INVENTOR
BY Victor J. Evans
ATTORNEY Patented Jan. 15, 1924.

1,481,165

UNITED STATES PATENT OFFICE.

LESLIE L. WELLS, OF PILGER, NEBRASKA.

WHIFFLE HOOK.

Application filed October 23, 1922. Serial No. 596,381.

*To all whom it may concern:*

Be it known that I, LESLIE L. WELLS, a citizen of the United States, residing at Pilger, in the county of Stanton and State of Nebraska, have invented new and useful Improvements in Whiffle Hooks, of which the following is a specification.

This invention relates to a whiffle hook, the general object of the invention being to provide means for preventing the hook from being detached when backing or turning.

Another object of the invention is to provide a spring loop for closing the space between the end of the hook and the body thereof for holding the hook engaging member in place.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side elevation showing a portion of a whiffle-tree and one end of a tug with the invention in use.

Figure 2 is a plan view.

Figure 3 is a detail sectional view.

In these views 1 indicates the whiffletree, 2 the tug, 3 the hook which is attached to the tree and 4 the hook engaging member which is attached to the tug. As is well known in backing or turning the member 4 is apt to slip off the hook and it is the object of my invention to prevent this by closing the space between the end of the hook and the body thereof. In carrying out my invention I provide a spring strip 5 and loop it and connect the ends thereof with the hook by a rivet 6. The rivet is so placed that the looped part will occupy the space between the extremity of the hook and the body thereof, thus preventing the member 4 from passing through said space unless it is forced by the spring strip and the end of the hook. This requires considerable effort as the strip must be bent to permit the member to pass by it so that there is no danger of the parts becoming separated unless they are separated forcibly by hand.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a loop and a hook carried thereby, of a resilient strip of metal looped above itself and arranged upon the shank of the hook in proximity to the extremity of the hook, and capable of movement within the loop when flexed, a rivet passing through the end of the strip and the shank.

In testimony whereof I affix my signature.

LESLIE L. WELLS.